United States Patent [19]

McDonald

[11] 4,152,839
[45] May 8, 1979

[54] LEVEL INDICATING DEVICE

[76] Inventor: Edward L. McDonald, 137 Fern St., Newark, Ohio 43055

[21] Appl. No.: 783,307

[22] Filed: Mar. 31, 1977

[51] Int. Cl.² ............................................. G01C 9/06
[52] U.S. Cl. ................................................... 33/366
[58] Field of Search ......................................... 33/366

[56] References Cited
U.S. PATENT DOCUMENTS

| | | |
|---|---|---|
| 2,511,525 | 6/1950 | Bradwell et al. ............. 33/366 |
| 3,299,523 | 1/1967 | Lea .................................. 33/366 |
| 3,823,846 | 7/1974 | Bhat et al. ...................... 33/366 |

Primary Examiner—Charles E. Phillips

[57] ABSTRACT

A pair of sealed capsules are provided in a housing. Each of the capsules has a first electrode extending therein on one side thereof from end to end. A pair of electrodes are positioned in each capsule at corresponding ones of the ends opposite the first electrode. A center electrode is positioned in each of the capsules at the center thereof opposite the first electrode. A bead of mercury is provided in each of the capsules. One of the capsules is positioned so that when the housing is horizontal the mercury therein contacts the first and center electrodes thereof and the other of the capsules is positioned so that when the housing is vertical the mercury therein contacts the first and one of the end electrodes thereof. A pair of center lamps and two pairs of end lamps are provided for the capsules and connected to the corresponding electrodes of each. The lamps are of different colors so that when the housing is positioned horizontally the center lamp of the first capsule is illuminated and when the housing is vertical the center lamp of the second capsule is illuminated. When the end lamps of the capsules are illuminated, the user knows that the housing is neither horizontal nor vertical.

1 Claim, 9 Drawing Figures

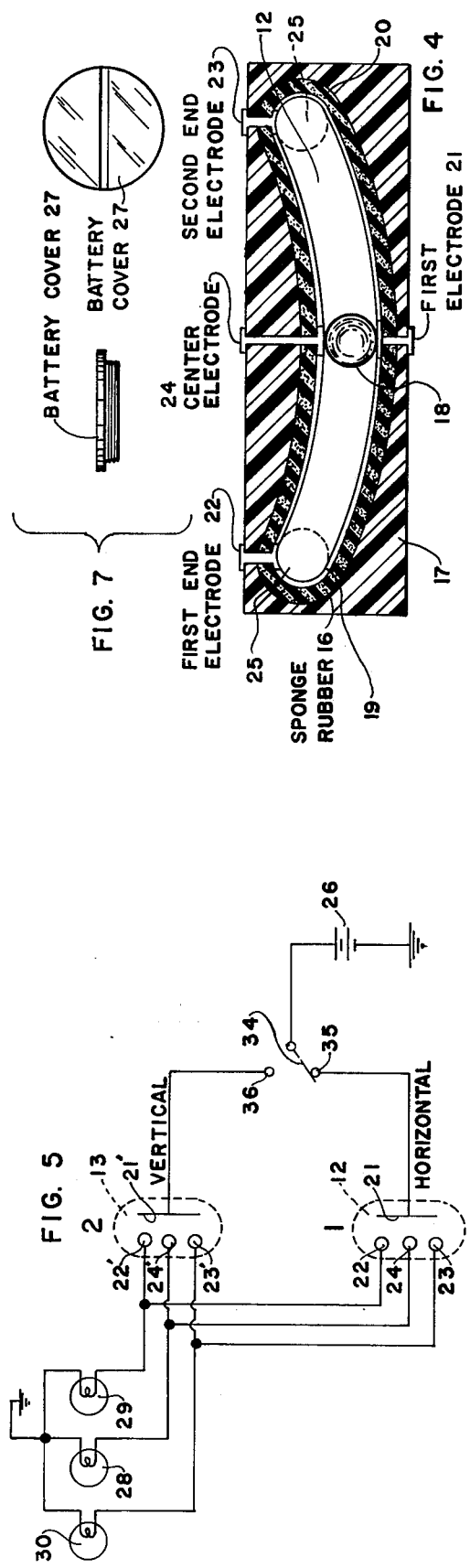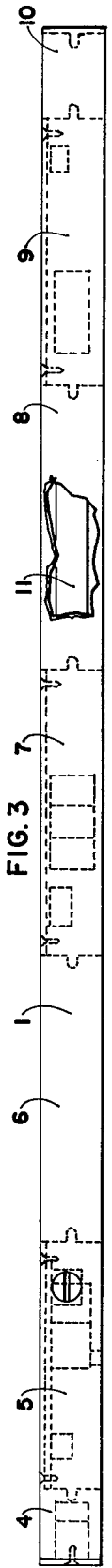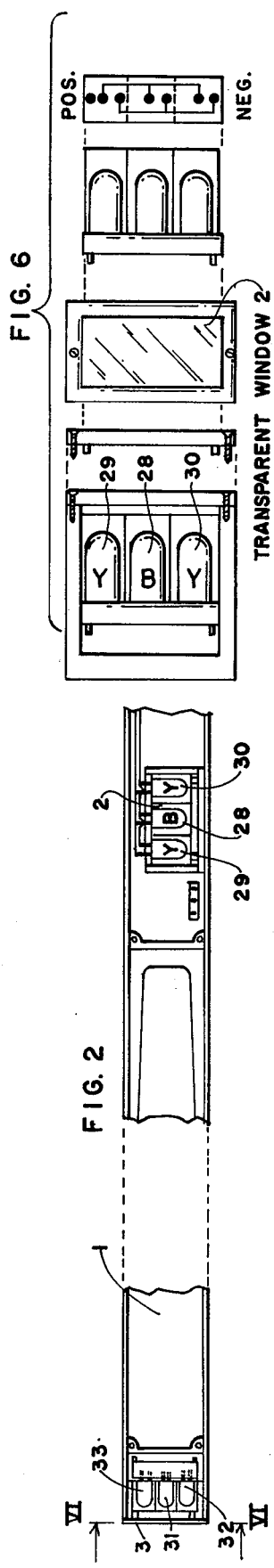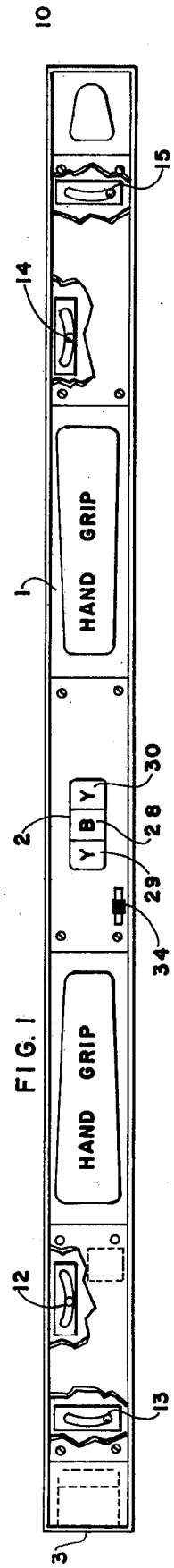

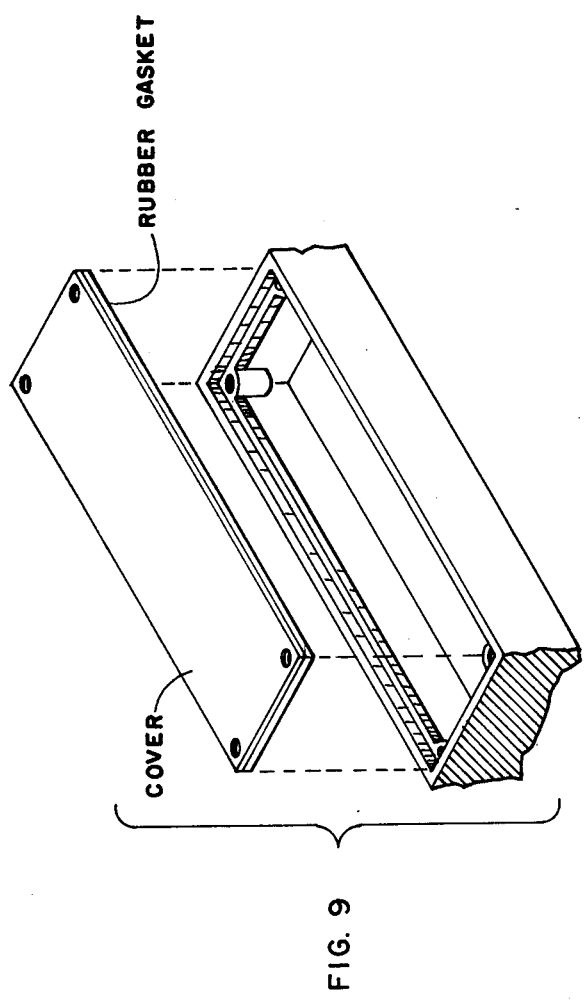
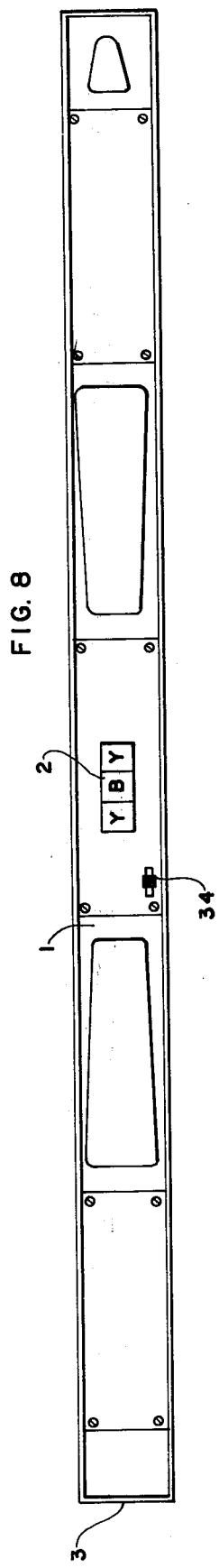

LEVEL INDICATING DEVICE

BACKGROUND OF THE INVENTION

The present invention relates to a level indicating device. More particularly, the invention relates to a level indicating device for indicating a true horizontal position, a true vertical position and divergences from true horizontal and vertical positions.

Objects of the invention are to provide a level indicating device of simple structure, which is inexpensive in manufacture, used with facility and convenience under most field conditions, used with complete facility by a single user without the need for constant close eye contact, and functions efficiently, effectively and reliably, and rapidly, to indicate a true horizontal position, a true vertical position and deviations or divergences from such positions. The level indicating device of the invention is thus applicable to all types of domestic and industrial operations such as carpentry, plumbing and all phases of construction, press rollers and assemblies and military operations such as weapons elevation, and the like.

BRIEF DESCRIPTION OF THE DRAWINGS

In order that the invention may be readily carried into effect, it will now be described with reference to the accompanying drawings, wherein:

FIG. 1 is a partly cut away top view of an embodiment of the level indicating device of the invention;

FIG. 2 is a side view of part of the embodiment of FIG. 1;

FIG. 3 is a schematic diagram illustrating a modular structure of the level indicating device of the invention;

FIG. 4 is a cross-sectional view, on an enlarged scale, of a capsule of the level indicating device of the invention;

FIG. 5 is a circuit diagram of the level indicating device of the invention;

FIG. 6 is a view, on an enlarged scale, of lamps and a corresponding window of the level indicating device of the invention;

FIG. 7 is an embodiment of the battery cover of the level indicating device of the invention;

FIG. 8 is a view of the level indicating device of the invention; and

FIG. 9 is a perspective view of a module of the level indicating device of the invention.

DETAILED DESCRIPTION OF THE INVENTION

The level indicating device of the invention is for indicating a true horizontal position, a true vertical position and divergences from true horizontal and vertical positions. The level indicating device of the invention comprises a housing 1 of substantially beam-like configuration having spaced first and second transparent windows 2 and 3 (FIGS. 1 to 3 and 8). The housing 1 may comprise a plurality of modules affixed to each other to form the whole, as indicated in FIG. 3. As shown in FIG. 9, each of the modules comprises a watertight housing enclosed in a watertight manner by a removable cover, so that the contents thereof are readily accessible.

As shown in FIG. 3, the housing 1 may comprise a plurality of modules 4, 5, 6, 7, 8, 9 and 10. A magnet 11 is shown in the module 8 and may be utilized to releasably affix the housing to a magnetizable metal during use so that the hands of the user are free.

A pair of sealed capsules of electrically insulative material of any suitable type such as, for example, sponge rubber embedded in plastic, are mounted in the housing 1 in spaced relation. Thus, a first pair of sealed capsules 12 and 13 and a second pair of sealed capsules 14 and 15 are shown in FIG. 1. The capsule 12 is shown on an enlarged scale in FIG. 4. As many pairs of capsules may be utilized as desired, although a single pair, mounted at substantially right angles to each other, as are the capsules 12 and 13, are all that are necessary for proper operation of the device of the invention.

As shown in FIG. 4, the capsule 12 is of sponge rubber 16 completely enclosed by plastic material 17. The capsule 12 has a center 18 and a pair of opposite ends 19 and 20. A first electrode 21 extends in the capsule 12 on one side thereof from the end 19 to the end 20.

As shown in FIG. 4, a first end electrode 22 is positioned in the capsule 12 at the end 19 thereof opposite the first electrode 21. A second end electrode 23 is positioned in the capsule 12 at the end 20 thereof opposite the first electrode 21. A center electrode 24 is positioned in the capsule 12, at the center 18 thereof, opposite the first electrode 21. A bead of mercury 25 is provided in the capsule 12.

The capsules 12 and 13 are identical. The capsules 14 and 15 are identical to the capsules 12 and 13. Additional pairs of capsules may be included, which are identical to the capsules 12 and 13. The first capsule 12 is positioned so that when the housing 1 is horizontal, as shown in FIG. 1, the mercury 25 therein contacts the first and center electrodes 21 and 24 thereof, as shown in FIG. 4. The second capsule 13 is positioned perpendicular to the first capsule 12 so that when the housing is vertical, the mercury 25 therein contacts the first and center electrodes 21' and 24' thereof.

The first and second capsules 12 and 13 are symbolically represented in the circuit diagram of FIG. 5.

A battery or batteries 26 of any suitable type (FIG. 5) are provided in the housing and are readily accessible for recharging and/or replacement via a removably affixed battery cover 27 (FIG. 7).

A first center lamp 28, which is preferably blue, and a first pair of end lamps 29 and 30, which are preferably yellow, are provided in the housing 1 at the first window 2 (FIGS. 1, 2 and 5). A second center lamp 31, which is preferably blue, and a second pair of end lamps 32 and 33, which are preferably yellow, are provided in the housing 1 at the second window 3 (FIG. 2). As shown in FIG. 5, the single set of lamps 28, 29 and 30 suffices, so that the second set of lamps 31, 32 and 33 is not really necessary, but may be utilized when the second window 3 is placed at the very end of the housing, as shown in FIGS. 1 and 2. This permits the lamps to be seen more easily from the end of the housing. When a single set of lamps is utilized, as shown in FIG. 5, it is connected in common to the center and first and second end electrodes of both capsules 12 and 13. When two sets of lamps are utilized, the lamps 28, 29 and 30 are connected to the center and first and second end electrodes of the first capsule and the lamps 31, 32 and 33 are electrically connected to the center and first and second end electrodes of the second capsule 13.

Electrical conductors in the housing 1, represented in FIG. 5, electrically connect the center lamp 28 in common to the center electrode 24 and 24', respectively, of the capsules 12 and 13, respectively, electrically connect the first end lamp 29 in common to the first end electrode 22 and 22', respectively, of the capsules 12 and 13, respectively, and electrically connect the second end lamp 30 in common to the second end electrode 23 and 23', respectively. The battery 26 is electrically connected to the center electrode 21 of the capsule 12 when the switch arm 34 of a switch is in electrical contact with a contact 35 of said switch, as shown in FIG. 5. The battery 26 is electrically connected to the center electrode 21' of the capsule 13 when the switch arm 34 of the switch is in electrical contact with the contact 36 of said switch (not shown in the FIGS.). Thus, when the user wishes to test for horizontal level, he moves the switch arm 34 into electrical contact with the contact 35. When he wishes to test for vertical level, he moves the switch arm 34 into electrical contact with the contact 36.

When the housing 1 is horizontal, the center lamp 28 is energized by the battery 26 via the mercury 25 in the first capsule 12 thereby indicating the fact to the user. When the housing 1 is at an angle with the horizontal, one of the end lamps 29 and 30 is energized by the battery 26 via the mercury 25 in the first capsule 12 thereby indicating to the user that the device is not on a horizontal level. When the housing 1 is vertical, the center lamp 28 or 31, dependent upon whether one or two sets of lamps are utilized, is energized by the battery 26 via the mercury 25 in the second capsule 13, thereby indicating such fact to the user. When the housing 1 is at an angle with the vertical, one of the end lamps 29 and 30 or 32 and 33, dependent upon whether one or two sets of lamps are utilized, is energized by the battery 26 via the mercury 25 in the second capsule 13, thereby indicating to the user that the device is not vertically level.

The first window 2 may be seen from both sides and both ends of the device. This is accomplished by any suitable means such as, for example, raising the window 2 and the lamps therein above the level of the surrounding housing.

The lamps in the first and second windows 2 and 3 are preferably connected in the same circuit, in a manner whereby the lamps will provide the same information, viewed from either side or from either end, whether they are positioned vertically or horizontally.

The module 10 (FIGS. 1 and 3) is an open part of the housing, from which the housing may be hung for storage.

The level indicating device of the invention is usable for automotive wheel alignment, leveling and adjusting missile components and computers, leveling transit levels in the field, carpentry and construction, plumbing and electrical installations, press rollers and assemblies, as a sensor for ON and OFF positions of valves in liquid, oil and gas lines, for earthquake detection by means of a radio signal and mercury tube, hydraulic motors and equipment related to hydraulic operation, space stations and satellites in which artificial gravitation is applied to the basic principle of the invention, in factories and manufacturing plants in space and on other planets where ordinary leveling methods are ineffective, for commercial and industrial optical equipment, equipment used by optometrists in treating patients, metering systems which are pressure or vacuum operated, and in the drilling of oil or gas wells.

While the invention has been described by means of a specific example and in a specific embodiment, I do not wish to be limited thereto, for obvious modifications will occur to those skilled in the art without departing from the spirit and scope of the invention.

I claim:

1. A level indicating device for indicating a true horizontal position, a true vertical position and divergences from true horizontal and vertical positions, said level indicating device comprising:

a housing comprising a plurality of modules and forming a substantially elongated beam-like configuration, the housing having an upper length surface and a pair of end surfaces substantially perpendicular to the upper length surface;

a pair of sealed capsules of electrically insulative material mounted in a first module of the housing in spaced relation, each having a center and a pair of spaced opposite ends, a first electrode extending therein on one side thereof from end to end, a pair of electrodes each positioned therein at a corresponding one of the ends opposite the first electrode, a center electrode positioned therein at the center thereof opposite the first electrode, and a bead of mercury therein, both of the capsules being of arcuate configuration, a first of the capsules being positioned concave relative to the upper length surface of the housing with the center electrode further from the upper length surface than the pair of end-positioned electrodes so that when the housing is horizontal the mercury therein contacts the first and center electrodes thereof and the second of the capsules being positioned convex relative to one of the end surfaces of the housing with the center electrode closer to said one of the end surfaces than the pair of end-positioned electrodes so that when the housing is vertical the mercury therein contacts the first and center electrodes thereof, each capsule being constructed of sponge rubber and being completely enclosed by plastic; battery means in the housing;

a center lamp and a pair of end lamps located in a second module and being visible through a window the end lamps being of a different color from the center lamp;

electrical conductors in the housing electrically connecting the lamps and the battery means in circuit in a manner whereby when the housing is horizontal the center lamp is energized by the battery means via the mercury in the first capsule, when the housing is at an angle with the horizontal one of the end lamps is energized by the battery means via the mercury in the first capsule, when the housing is vertical the center lamp is energized by the battery means via the mercury in the second capsule and when the housing is at an angle with the vertical one of the end lamps is energized by the battery means via the mercury in the second capsule.

* * * * *